Oct. 3, 1944.  K. M. GLESZER ET AL  2,359,361
COMPOSITE METAL ELEMENT AND METHOD OF MAKING SAME
Filed March 6, 1942
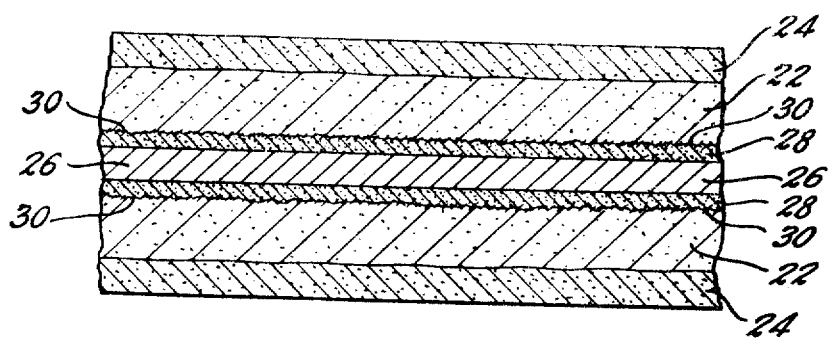
INVENTORS
KENNETH M. GLESZER
ROLAND P. KOEHRING
BY
THEIR ATTORNEYS Patented Oct. 3, 1944

2,359,361

UNITED STATES PATENT OFFICE 2,359,361

COMPOSITE METAL ELEMENT AND METHOD OF MAKING SAME

Kenneth M. Gieszer and Roland P. Koehring, Dayton, Ohio, assignors to General Motors Corporation, Detroit, Mich., a corporation of Delaware Application March 6, 1942, Serial No. 433,598

5 Claims. (Cl. 29—181)

This invention relates to composite metal elements and is particularly concerned with braking elements having high strength and the ability to limit the temperature at the friction surface by heat conduction during the use thereof. The invention also relates to the methods of bonding together a plurality of layers of different types of metals at least one of which is made from metal powders.

An object of this invention is to provide a friction element, such as a brake, clutch or the like, which will have a friction surface thereon that has good frictional qualities and which friction surface includes an associated portion having good heat conducting qualities whereby the temperature of the friction surface during use is limited to a desired value.

Another object of the invention is to provide a friction element with a ferrous surface which has a backing of a metal with good heat conducting and absorbing qualities, such as copper, and wherein the entire structure is supported by a strong steel supporting member.

In carrying out the above objects it is a further object to provide a friction surface made from briquetted sintered iron powder which surface is bonded to a layer of briquetted sintered copper powder which in turn is metallurgically and mechanically attached to the surface of a steel supporting element.

A further object is to provide a laminated article that includes a dense metal supporting surface having a matrix layer bonded thereto formed from sintered non-compacted metal powder, said matrix layer supporting and holding a compressed and sintered metal powder layer.

Further objects and advantages of the present invention will be apparent from the following description, reference being had to the accompanying drawing wherein preferred embodiments of the present invention is clearly shown.

In the drawing:

The drawing represents a cross sectional, fragmentary view of a friction element, such as a brake, wherein a friction surface is provided at both sides thereof.

Friction elements made from metal powders and used as clutches and brakes are used in a number of commercial applications.

Friction surfaces made from sintered metal powders have many advantages, particularly from a wear standpoint, which can not be duplicated in conventional types of frictional material.

Friction articles made from sintered metal powders have high strength and due to the usually porous nature of the surface yield frictional qualities not apparent in similar metals made by convenient practices. In the past frictional articles made from sintered metal powders have been used for the most part for clutch facings and the like.

Our invention is particularly directed to another type of frictional surface which may be used as a clutch but which is more desirably used as a brake element, for heavy duty work, one of such applications being as a disc type brake in aeronautical brake installations. Friction surfaces such as brakes used in installations of this type are rapidly heated through friction to extremely high temperatures and it is desiralbe to reduce or limit these temperatures. We have found that ferrous material, such as is made from sintered iron powder, presents a friction surface having very desirable characteristics for use as a brake. Furthermore, the iron having a relatively high melting point is heat resisting and, therefore, provides a brake element that is exceptionally well suited for heavy duty work. Iron, however, does not have sufficient heat conductivity to limit the temperature at the braking surface to a desired value. We, therefore, propose to use a cupreous backing 22 with a ferrous friction layer 24 thereon whereby the friction layer is bonded to the cupreous layer which is preferably pure copper. This layer is preferably of greater thickness than the iron layer and, due to its good heat conductivity limits the temperature of the iron facing.

Articles formed from sintered metal powder, while having good strength, often do not have sufficient strength for this particular application due to constructural details. Therefore, we further propose to bond our friction element, consisting of an iron friction surface with a heat conducting copper backing, directly to a steel plate 26 and thereby make use of the strength of the steel. This laminated structure forms an ideal friction element and in many cases the steel plate may include frictional surfaces on both sides thereof.

In order to obtain a satisfactory bond between the copper layer and the steel, the surface of the steel is conditioned to roughen the same and to form a plurality of inter-locking pores therein which is indicated as a matrix layer 26. Such conditioning consists of distributing a uniform layer of metal powder on the surface of the steel which metal powder is maintained in the loose non-compacted condition, thereby forming, when sintered, a highly porous metal layer or matrix. We prefer to use 60 parts of iron powder and 40 parts of copper powder in this layer wherein the iron powder is preferably 170 mesh or larger. This material after distribution on the steel is heated above the melting point of the copper but below the melting point of iron whereby particles of iron are copper brazed to the surface of the steel. This procedure can be carried out on both sides of the steel if a friction surface on both sides is desired. Other proportions and compositions for the matrix layer may be used when desired and the grain size of metal powder used may be varied to obtain any desired texture of matrix. Various compositions are disclosed in Koehring Pat. 2,198,253.

After the conditioning treatment we next prefer to apply a very thin layer of silver 30 upon the surface of the matrix to facilitate bonding. This silver may be in the form of silver foil, silver plate or silver powder. Silver powder is generally preferred as it is possible to dispose the powder particles in more intimate contact with the matrix surface since some of these particles will go into the pores of the matrix surface. The silver upon the surface of the matrix facilitates bonding of the powder subsequently placed thereon. The steel plate is next placed in a die and positioned at the bottom thereof. The die is then filled with the required quantity of copper powder so that when the metal powder is compressed a layer of the desired thickness results. After the copper powder is in place a layer of iron powder is superimposed thereon of suitable depth. Then both layers are briquetted simultaneously for causing the iron powder layer to adhere to the copper powder layer and to cause portions of the copper powder layer to be forced into the pores of the matrix whereby both the iron and copper powder layers are mechanically locked or held to the surface of the steel through the medium of the matrix. Such a procedure is discussed in detail in U. S. Patent No. 2,251,410, assigned to the assignee of the present application. We have found that pressures ranging from 20,000 to 70,000 pounds per square inch provide suitable results with pressures varying in accordance with the strength desired. The steel plate with the iron copper friction surface thereon is then removed from the die and sintered under suitable non-oxidizing conditions at a temperature around 1930° F. for a period of one-half hour to an hour and preferably 45 minutes. We have found that at this temperature the thin silver layer diffuses into the copper at both sides thereof, that is to say, into the copper coating of the iron particles in the loose, non-compacted layer and likewise into the copper of the copper layer by formation of a eutectic mixture which melts at the sintering temperature and expedites the bonding. The silver layer forms an important part of our invention since it expedites bonding, which bonding is often difficult to accomplish in a relatively short time period when powders having a single metallic constituent only are used.

We have found a finished article having a ferrous friction surface of 1/32" thick and a copper heat-conducting layer of 1/16" thick is adequate to maintain the iron friction surface at satisfactory temperatures under one set of operating conditions and at a lower temperature than was possible with conventional materials under the same conditions.

Varying thicknesses can be used with satisfactory results in accordance with the application desired and may best be arrived at by test.

It is apparent that other materials may be utilized although we have found for the specific purpose that a ferrous friction surface having a high percentage of iron therein is preferred. Obviously varying quantities of the alloying ingredients, such as nickel, chromium, vanadium, cobalt, carbon, etc., together with non-metallic friction producing substances such as, silica, Alundum, asbestos, etc., may be used in specific instances. Likewise in the cupreous layer varying quantities of alloy ingredients may be present without deleterious effects in certain instances, such ingredients being tin, cadmium, chromium, beryllium and the like.

It is manifest that the sintering times and temperatures may be varied within wide limits, for example, the temperature may be lowered if the time is increased and vice versa, the specific limitation in the sintering of a copper-iron friction surface being that the iron should be properly sintered and that the melting point of copper should not be exceeded. Temperatures and times for sintering articles of this type may best be arrived at by trial since as the size of the piece varies the control conditions may likewise vary.

It is apparent from the foregoing that we have provided an article and method of making same which may be used in heavy-duty braking installations and wherein the friction surface thereof is long wearing and has suitable frictional characteristics together with suitable heat-conducting characteristics and necessary strength.

The foregoing description has been directed to a specific application. It is apparent that the method may be utilized in the fabrication of many other and different articles wherein layers are made from other metal powders and are bonded to a solid supporting member. In all cases a matrix layer is provided which is bonded to the solid metal and which acts as a mechanical locking means for holding the briquetted metal powder layer tightly thereto during the bonding operation thereby preventing the briquetted layer from coming out of contact with the dense metal through slight warpage during sintering. In cases of a single metal powder in the briquetted layer bonding is facilitated by including a layer of bonding metal which is interposed between the matrix layer and the briquetted metal powder layer. This bonding layer should be a metal which will form a liquid constituent with at least one of the metals in each of the contiguous layers at or below the sintering temperature. In this manner, the briquetted powder layer is sintered, and, through the liquid constituent formed by the action of the bonding metal therewith, is metallurgically bonded to the solid metal through the medium of the matrix layer. A mechanical bond also exists through the interlocking effect of the briquetted layer upon the matrix layer. We prefer this bonding metal to be silver when using copper or copper bearing materials since silver readily forms a eutectic with copper, which eutectic has a relatively low melting point in comparison with the melting point of pure copper. Likewise a strong bond is formed which in itself has a sufficiently high melting point to prevent superficial fusion thereof at normal temperatures encountered during operations of the bearings, brakes, clutches or the like.

The supporting elements, or the solid metal elements, have been referred to herein as steel. It is to be understood, however, that other metals such as copper, nickel, alloys thereof and alloy steels may likewise be used successfully. Steel, however, is preferred in the average application since it has good strength and is relatively inexpensive.

While the embodiments of the present invention as herein disclosed, constitute preferred forms, it is to be understood that other forms might be adopted, all coming within the scope of the claims which follow.

What is claimed is as follows:

1. A composite laminated friction material for use as a heavy duty brake, clutch or the like, comprising in combination, a solid steel supporting element having sufficient strength to impart strength to the entire structure, a highly porous layer of copper-iron powder bonded thereto, a cuprous layer bonded to the said highly porous layer and including an appreciable quantity of silver adjacent the bonded portion and a ferrous layer briquetted and sintered to said cuprous layer and held to the steel by means of the highly porous layer, said cuprous layer acting as a heat conductor for heat generated in the ferrous layer, whereby the temperature of the ferrous layer is limited by heat flow through the intermediate layer into the steel, said silver content at the bonded portion of the first and second layers being sufficient to act as a bonding medium for bonding the copper to the highly porous layer.

2. A composite laminated friction material for use as a heavy duty brake, clutch or the like, comprising in combination: a solid metal supporting element of high melting point and high tensile strength for imparting strength to the structure, a relatively thin sintered layer of loose non-compacted metal powder including appreciable quantities of copper and iron bonded to the surface of said element, a relatively thicker layer of sintered copper powder bonded to the first mentioned sintered layer by means of an interposed strata of material having an appreciable silver content wherein the silver is present in quantities sufficient to function as a bonding medium, and a ferrous layer of sintered briquetted iron powder bonded to and supported by said copper layer whereby the copper layer acts as a heat conductor for limiting the temperature of the friction surface during use thereof.

3. In a method of making a composite friction element comprising a sintered metal portion bonded to a solid metal support of relatively higher tensile strength, the steps comprising: sintering a layer of loose, non-compacted metal powder of relatively small depth on the surface of a metal support at a temperature below the melting point of the support and under suitable conditions to form a highly porous layer bonded to said support, distributing a very thin layer of silver powder upon the surface of said sintered layer, superimposing a layer of copper powder on the surface of the silver layer, and then superimposing a layer of iron powder upon said copper powder, briquetting the iron copper and silver layers under sufficient pressure to cause adherence thereof to said porous metal layer and simultaneously causing the iron copper and silver layers to become more dense, and finally sintering the entire structure under suitable conditions of time, temperature and atmosphere for causing the iron and copper layers to form strong porous metal layers metallurgically bonded together and metallurgically bonded to the first sintered metal layer by the action of said silver layer.

4. A composite laminated friction article, having a porous metal friction surface supported by a steel backing member, for use as a heavy duty brake, clutch, or the like, comprising in combination; a laminated structure including a strong steel backing member and a porous metal portion bonded thereto, said porous metal portion including a sintered layer of non-compacted metal powder comprising in the neighborhood of 40 parts copper and 60 parts iron bonded directly to the steel and carried thereon, a sintered briquetted copper layer bonded to a sintered briquetted iron layer, said sintered copper layer being superimposed upon said sintered non-compacted metal powder layer, said two layers being held together at their contiguous surfaces by a bonding medium including sufficient silver to effect a bond therebetween having the desired strength, whereby the steel backing member provides the strength and rigidity for the structure, the copper layer acts as an intermediate conductor and the iron layer acts as the friction surface.

5. In the method of making a composite friction element including a porous metal friction surface supported by a steel backing member, the steps comprising: sintering a loose layer of copper-iron powder in the non-compacted condition and in a relatively small depth upon the surface of a steel backing member at a temperature and in an atmosphere and for a time sufficient to cause the copper-iron layer to bond to the surface of the steel and simultaneously to make a highly porous layer, distributing a very thin layer of metal powder having a high silver content on the surface of said copper-iron layer, superimposing a layer of copper powder on the surface of the silver layer, superimposing a layer of iron powder upon the said layer of copper powder, briquetting the iron-copper and silver powder at pressures ranging from 20,000 to 70,000 pounds per square inch so as to cause adherence thereof to the sintered metal layer and to simultaneously cause the iron, copper and silver powder layers to become densified, and finally sintering the entire structure at temperatures in the neighborhood of 1930° F. for a period of from one-half hour to an hour and under non-oxidizing conditions for causing the iron and copper layers to form strong porous metal layers metallurgically bonded together and metallurgically bonded to said backing member through the medium of the first sintered layer and the bonding action of the high silver content layer.

KENNETH M. GLESZER.
ROLAND P. KOEHRING.